(12) United States Patent
Miller et al.

(10) Patent No.: US 6,237,628 B1
(45) Date of Patent: May 29, 2001

(54) SELF-CENTERING WATER DRAIN VALVE

(75) Inventors: Paul D. Miller; A. Caner Demirdogen; Dwight S. Suiter, all of Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/613,413

(22) Filed: Jul. 10, 2000

(51) Int. Cl.[7] .................................................. F16K 11/087
(52) U.S. Cl. ...................... 137/588; 137/625.47
(58) Field of Search ................. 137/588, 625.47

(56) References Cited

U.S. PATENT DOCUMENTS

| | | | |
|---|---|---|---|
| 347,131 | * 10/1886 | Scoville | 137/588 |
| 620,262 | * 2/1899 | Tong | 137/588 |
| 2,665,879 | 1/1954 | Housekeeper et al. | 251/163 |
| 2,788,016 | 4/1957 | Scherer | 137/246.19 |
| 3,378,035 | * 4/1968 | Waddington et al. | 137/588 |
| 4,078,763 | 3/1978 | Yamamoto | 251/96 |
| 4,549,716 | 10/1985 | Warren | 251/96 |
| 4,602,657 | 7/1986 | Anderson, Jr. et al. | 137/595 |
| 4,976,285 | 12/1990 | Church et al. | 137/588 |
| 5,038,670 | 8/1991 | Roe | 91/455 |
| 5,653,420 | 8/1997 | Sell | 251/95 |

* cited by examiner

Primary Examiner—John Fox
(74) Attorney, Agent, or Firm—Woodard, Emhardt, Naughton, Moriarty & McNett

(57) ABSTRACT

A water drain valve for use in cooperation with a fuel filter having a water separation capability includes a valve housing, a flow-control piston disposed within the valve housing, a first sealing grommet defining a water flow path into the valve housing, a second sealing grommet defining an air flow path out of said valve housing and a spring-biased control lever assembled to the valve housing and cooperating with the flow-control piston so as to rotate the piston from a drain valve normally-closed condition to a drain valve normally-pen condition. The valve housing is a unitary casting having a sidewall defining first and second flow apertures, one of which receives the first sealing grommet and the other of which receives the second sealing grommet. The flow-control piston includes a first part-spherical portion which includes a water drain passageway therethrough leading to a drain opening which is defined by the valve housing. The flow-control piston also includes a second part-spherical portion defining an air flow passageway therethrough leading from the drain opening. In the normally-closed condition, the flow-control piston is turned such that the first part-spherical portion closes the flow communication between the water drain passageway and the water flow path. Concurrently, the second part-spherical portion closes the flow communication between the air flow passageway and the air flow path. In the opened condition, there is flow communication between the water drain passageway and the water flow path and between the air flow passageway and the air flow path for draining water from the fuel filter and providing vent air into the fuel filter.

29 Claims, 20 Drawing Sheets

SELF-CENTERING WATER DRAIN VALVE

BACKGROUND OF THE INVENTION

The present invention relates in general to fuel filters with a water separation capability and the cooperating components and subassemblies used with such fuel filters. More specifically the present invention relates to the design of a water drain valve for draining accumulated water from within a fuel filter which is designed with a water separation capability. As used herein, the reference to a "drain" includes the flow passageway from the filter housing into the drain valve and the outlet passageway or aperture of the drain valve which empties the draining water from the drain valve. The structural remainder of the drain valve controls the flow of water from the flow passageway of the filter housing to the outlet passageway of the drain valve. Venting air is introduced by the drain valve as the water empties.

One of the concerns when draining accumulated water is the possibility that there will be a spillage of fuel from the drain valve. There are also design considerations in the construction of water drain valves including how to vent the drain valve. Related to the venting consideration is whether a check valve is needed so that drainage does not occur until the drain (valve) is deliberately opened in order to drain the accumulated water.

Whatever the desired specifics might be for the design of the drain valve, the aspects of reliability, ease of use, and low cost remain important considerations. The present invention provides the novel design of a water drain valve which takes into consideration each of these important considerations. In addition, the water drain valve of the present invention provides a vented, water drain valve which is suitable for use in both non-pressurized and pressurized configurations without the unwanted spillage of fuel. The water drain valve of the present invention is also designed without the added cost of a check valve. These various design features are enabled by combining the vent portion of the assembly into a drain port by way of a separate passageway to provide atmospheric air for venting. All of this is configured in a novel and unobvious manner.

SUMMARY OF THE INVENTION

A water drain valve for use in cooperation with a fuel filter having a water separation capability according to one embodiment of the present invention comprises a valve housing having a sidewall defining a first flow aperture therethrough and a second flow aperture therethrough and further defining a hollow interior extending into a drain opening, a flow-control piston positioned within the hollow interior and including a first portion defining a water drain passageway leading to the drain opening and a second portion defining an air flow passageway leading from the drain opening, a first sealing grommet assembled into the first flow aperture and having a sidewall defining a water flow path into the drain valve and being constructed and arranged to sealingly engage the first portion, a second sealing grommet assembled into the second flow aperture and having a sidewall defining an air flow path from the drain valve and being constructed and arranged to sealingly engage the second portion, and a spring biased control lever assembled to the valve housing and being constructed and arranged to rotate the flow-control piston from a drain valve normally-closed condition wherein the water flow path through the first sealing grommet is blocked by the first portion and the air flow path through the second sealing grommet is blocked by the second portion to a drain valve opened condition wherein the water drain passageway is aligned with the water flow path and the air flow passageway is aligned with the air flow path.

One object of the present invention is to provide an improved water drain valve for use with a fuel filter.

Related objects and advantages of the present invention will be apparent from the following description.

DESCRIPTION OF THE PREFERRED EMBODIMENT

Figure 1:
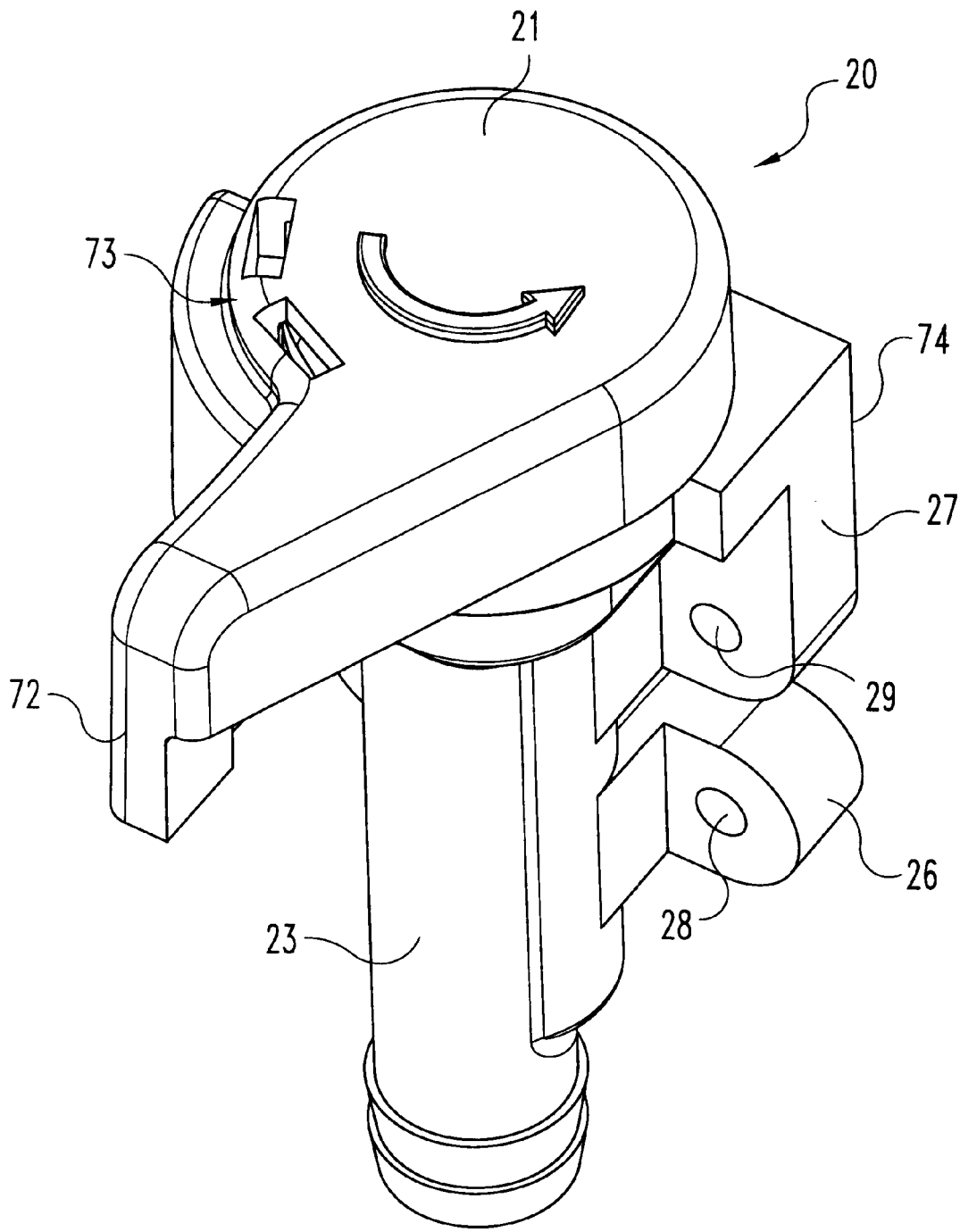
FIG. 1 is a perspective view of a water drain valve according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
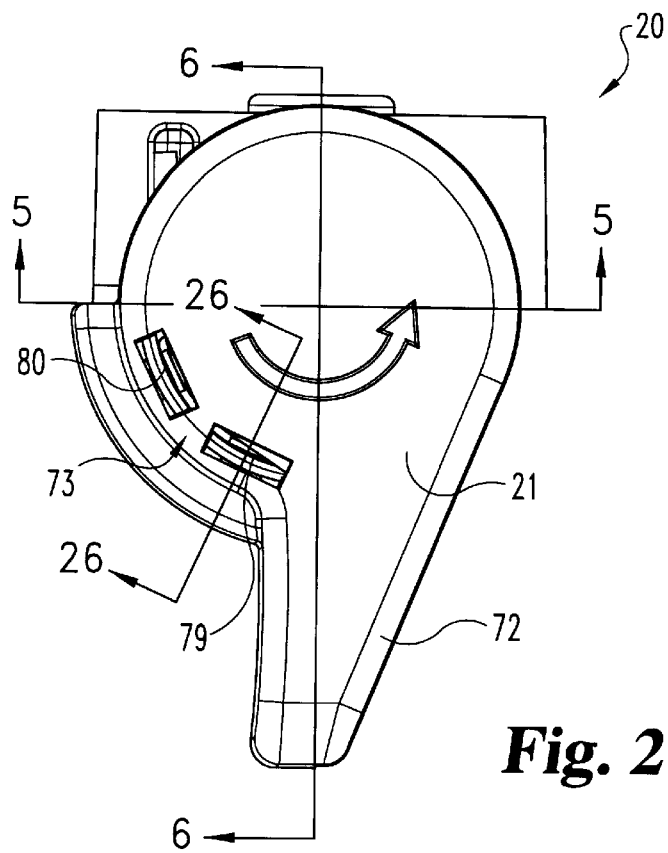
FIG. 2 is a top plan view of the FIG. 1 water drain valve in a closed condition.
Figure 3:
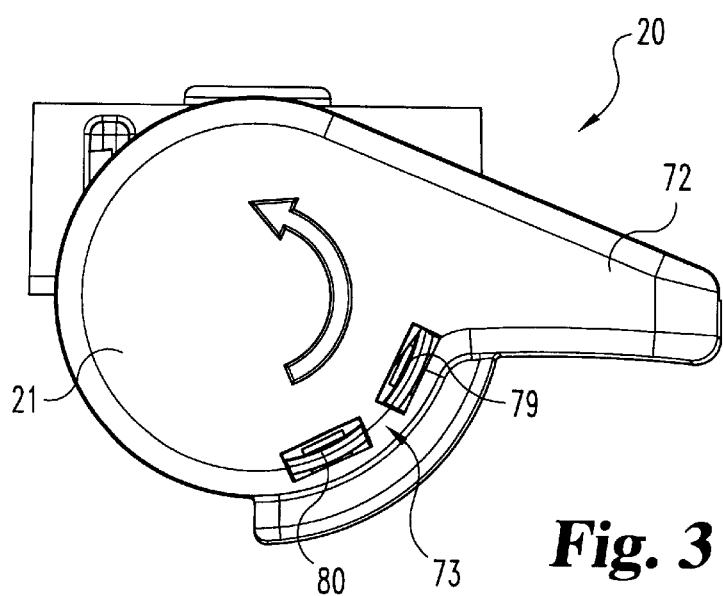
FIG. 3 is a top plan view of the FIG. 1 water drain valve in an open condition.
Figure 4:
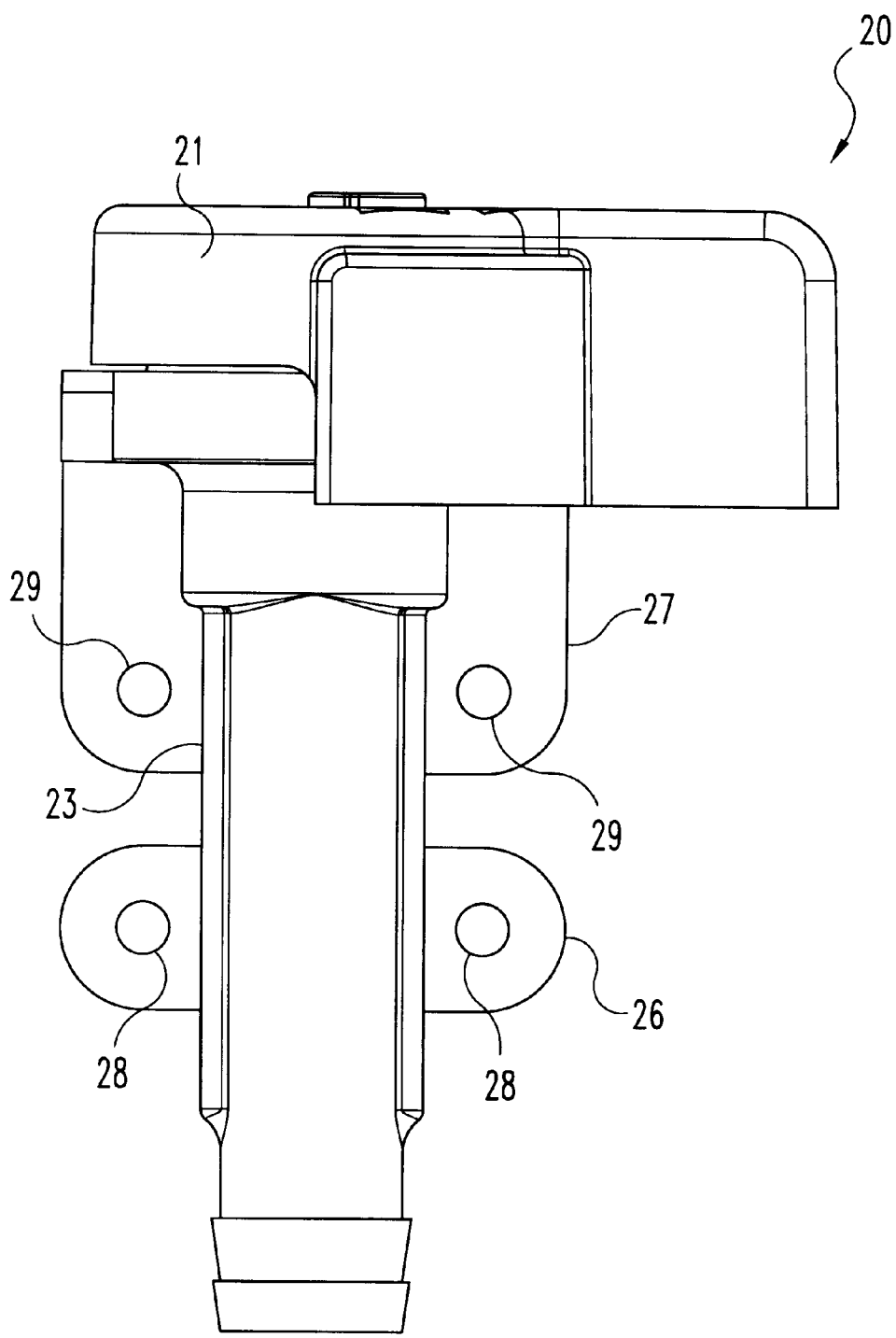
FIG. 4 is a front elevational view of the FIG. 1 water drain valve in an open condition.
Figure 5:
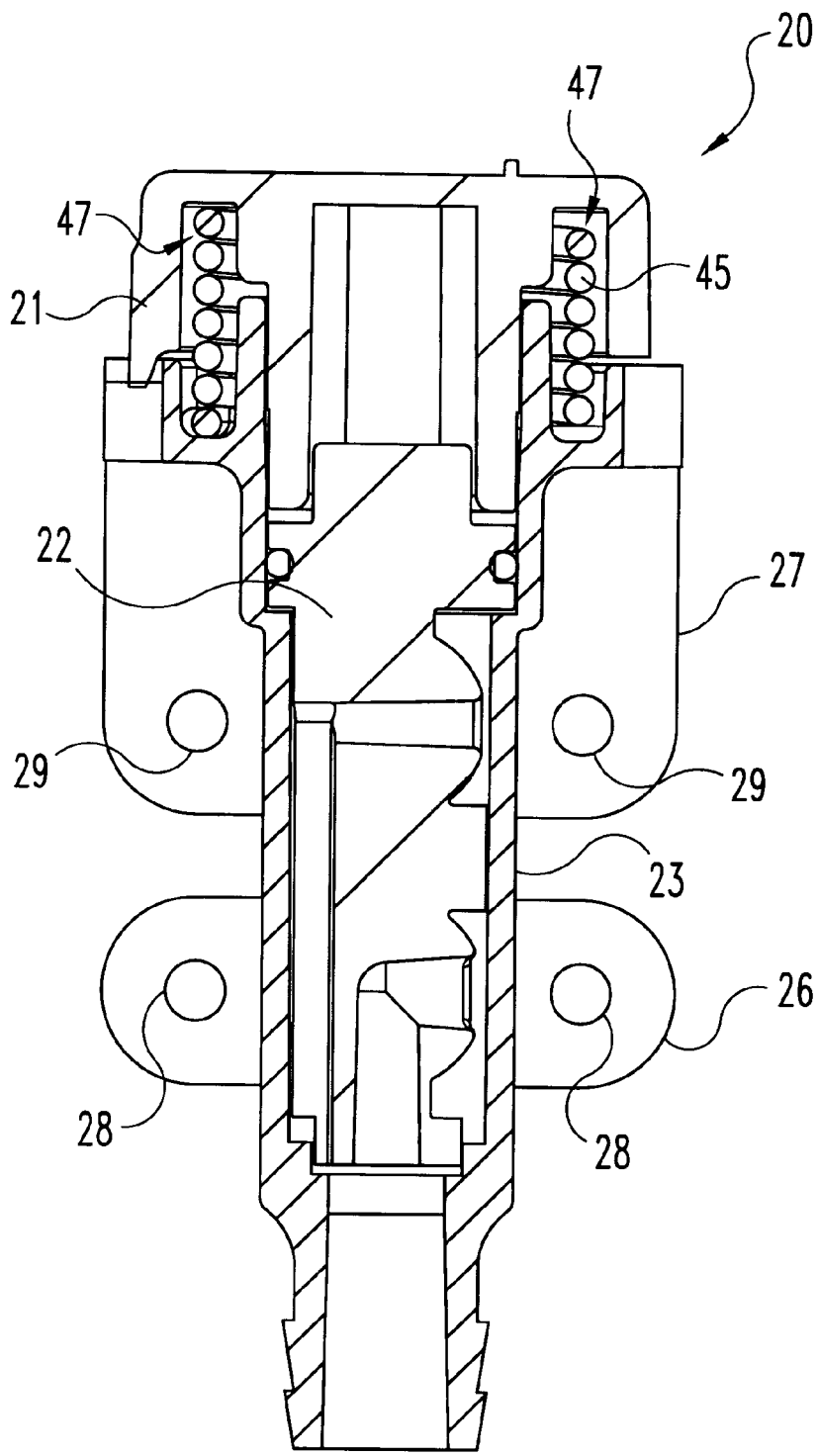
FIG. 5 is a front elevational view in full section of the FIG. 1 water drain valve in a closed condition, as viewed along line 5—5 in FIG. 2.
Figure 6:
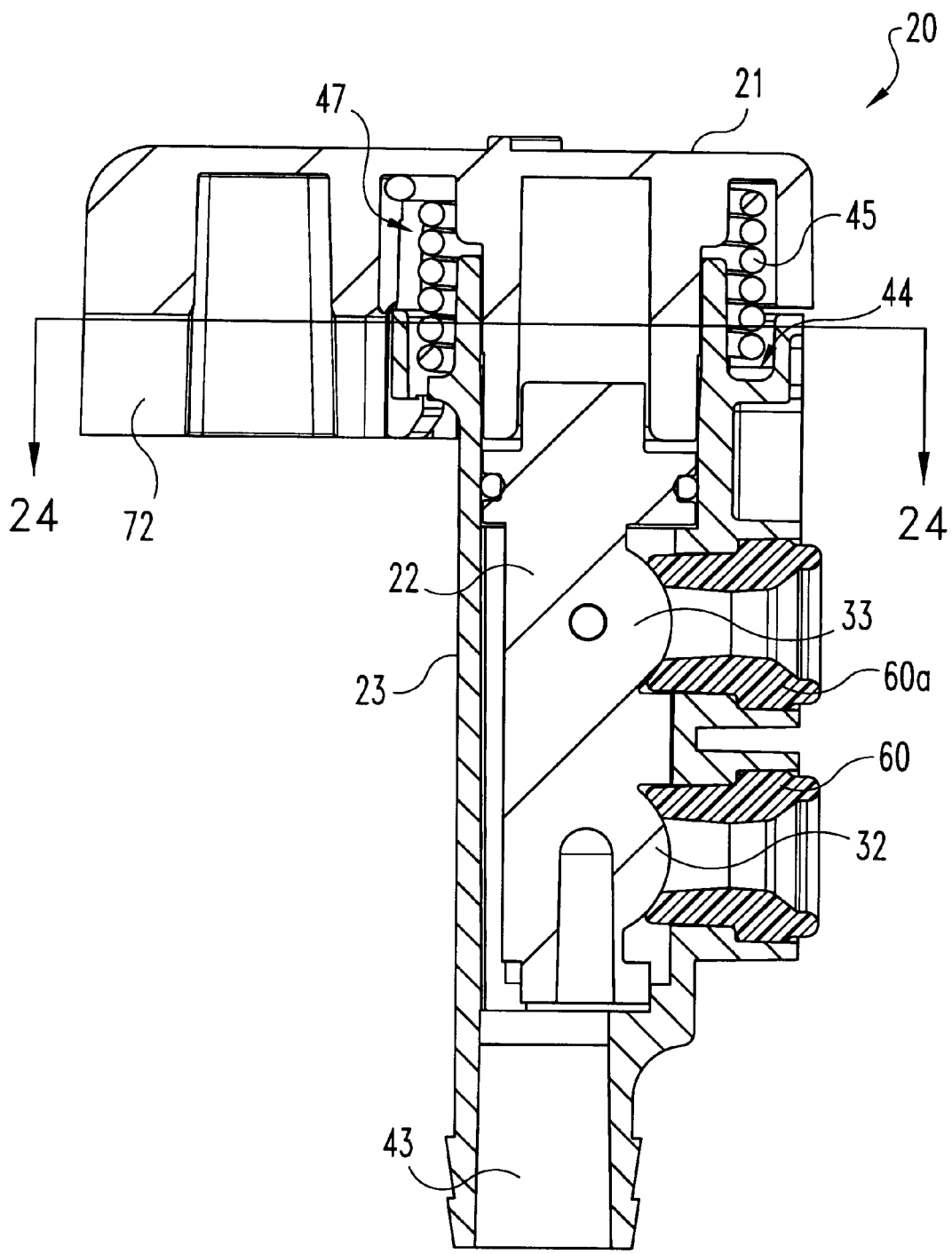
FIG. 6 is a side elevational view in full section of the FIG. 1 water drain valve in a closed condition, as viewed along line 6—6 in FIG. 2.
Figure 7:
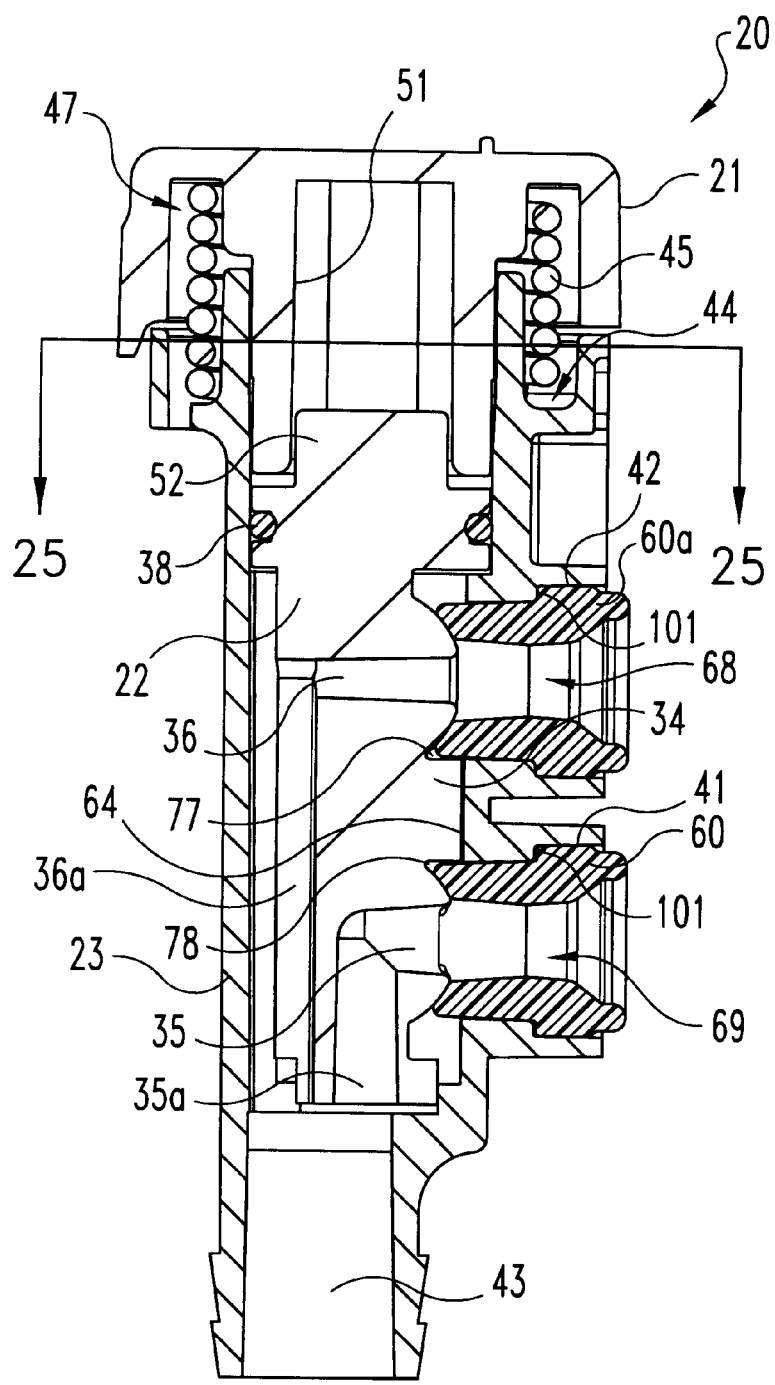
FIG. 7 is a side elevational view in full section of the FIG. 1 water drain valve in an open condition, based upon sectioning plane 6—6
Figure 8:
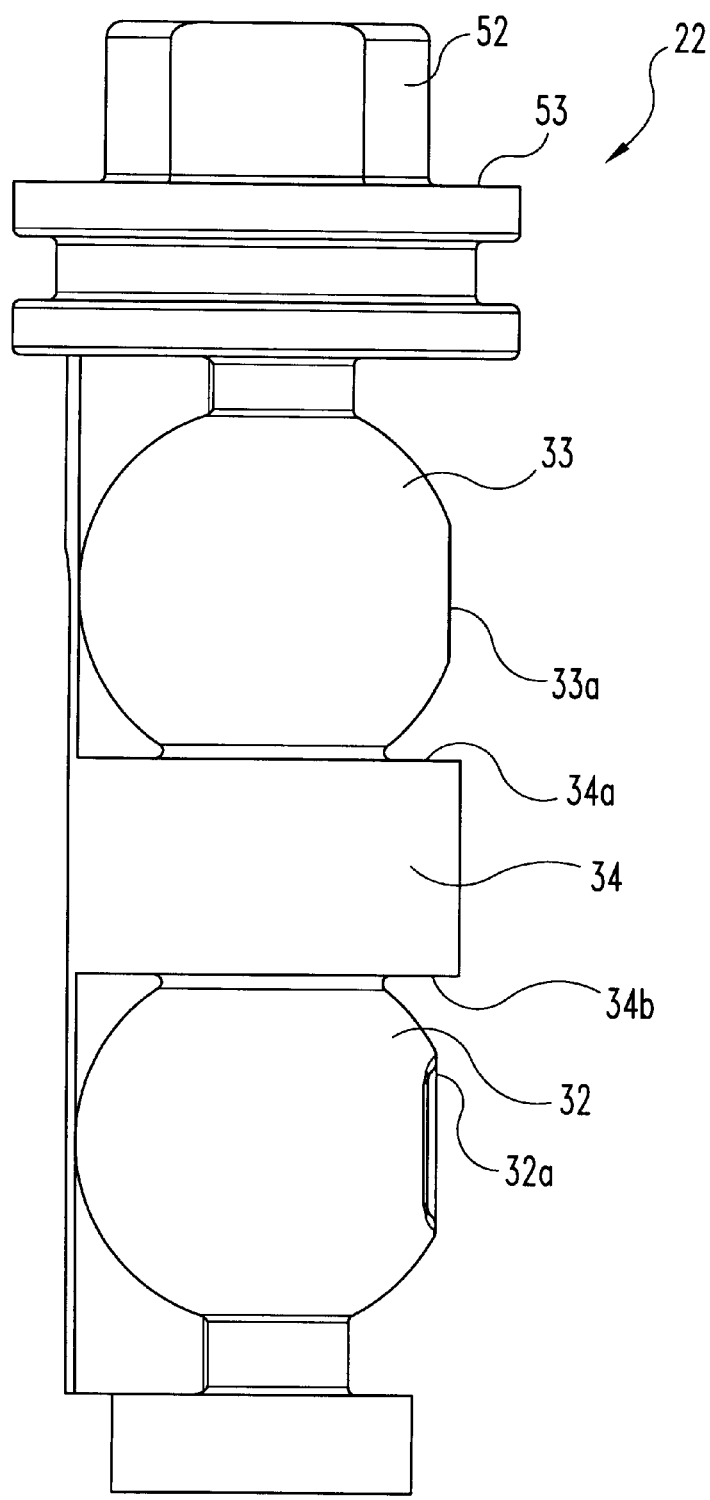
FIG. 8 is a front elevational view of a flow-control piston comprising a portion of the FIG. 1 water drain valve according to the present invention.

Referring to FIGS. 1–7, there is illustrated a water drain valve 20 which is constructed and arranged according to a preferred embodiment of the present invention. FIG. 1 is a perspective view of the drain valve 20 in its normally-closed condition which coincides with the FIG. 2 top plan view. FIG. 3 is a top plan view of the drain valve 20 in its open condition which coincides with the FIG. 4 front elevational view. The sectioning plane 5—5 view drawn in FIG. 2 is illustrated in FIG. 5 as a front elevational view of the drain valve 20 in full section in the normally-closed condition. The view at 90 degrees is created from the sectioning plane 6—6 view in FIG. 2 as illustrated in FIG. 6 as a side elevational view of the drain valve 20 in full section in the normally-closed condition. Since the drain valve has a different internal orientation when changing from the normally-closed condition to the valve-open condition, FIG. 7 is included. FIG. 7 is a front elevational view in full section corresponding to FIG. 6, but with the control lever 21 turned 90 degrees (see FIG. 3) so as to rotate the interior, flow-control piston 22 within outer housing 23 to place the drain valve 20 into its valve-open condition. The details of the interior flow-control piston 22 are illustrated in FIGS. 8–11. The details of the outer housing 23 are illustrated in FIGS. 12–16. The details of control lever 21 are illustrated in FIGS. 17–20.

The drain valve 20 of the present invention includes a construction by which the flow-control piston 22 cooperates with the interior features and construction of the outer housing in order to provide a functioning drain valve which is in a normally-closed condition or orientation. An air vent feature is included as part of drain valve 20 and the opening or closing of the water drain passageway coincides with the opening or closing of the air vent passageway, respectively. The control lever 21 is assembled in a spring-biased manner such that when manually moved from its normally-closed position to the valve-open position, the release of manual force on the control lever allows it to return automatically (spring return) to the normally-closed position.

The control lever 21 is cooperatively coupled to the piston 22 in order to rotate the piston 22 relative to the stationary outer housing 23 and thereby change the condition of the drain valve 20 from closed to open. Mounting provisions in the form of brackets 26 and 27 and clearance holes 28 and 29, respectively, are included as part of the outer housing 23. Preferably, the outer housing is a unitary casting and the brackets 26 and 27 are cast as part of this unitary construction. If synthetic materials are used for the outer housing 23, then a molded unitary construction is contemplated, still including the two mounting brackets 26 and 27 as part of this unitary construction. As described, the drain valve 20 is constructed and arranged for attachment to a fuel filter housing for draining accumulated water from the interior of the fuel filter housing.

With reference to FIGS. 8, 9, 10 and 11, the piston 22 of drain valve 20 is illustrated as a unitary member which is preferably cast. As an alternative, a molded construction is contemplated, but still as a unitary member. Piston 22 includes two part-spherical sections 32 and 33 which are positioned on opposite sides of alignment portion 34. These two sections 32 and 33 are described as being "part" spherical due to the flatted face 32a on section 32 and the flatted face 33a on section 33 into which flow passageways 35 and 36, respectively, are created. Flow passageway 35 extends into face 32a of section 32 and provides part of the water drain path for water drain valve 20. The remainder of the water drain path through the piston 22 is provided by connecting passageway 35a. Flow passageway 36 extends into face 33a of section 33 and provides part of the air vent path through water drain valve 20. The remainder of the air vent path through the piston is provided by connecting passageway 36a.

Figure 11:
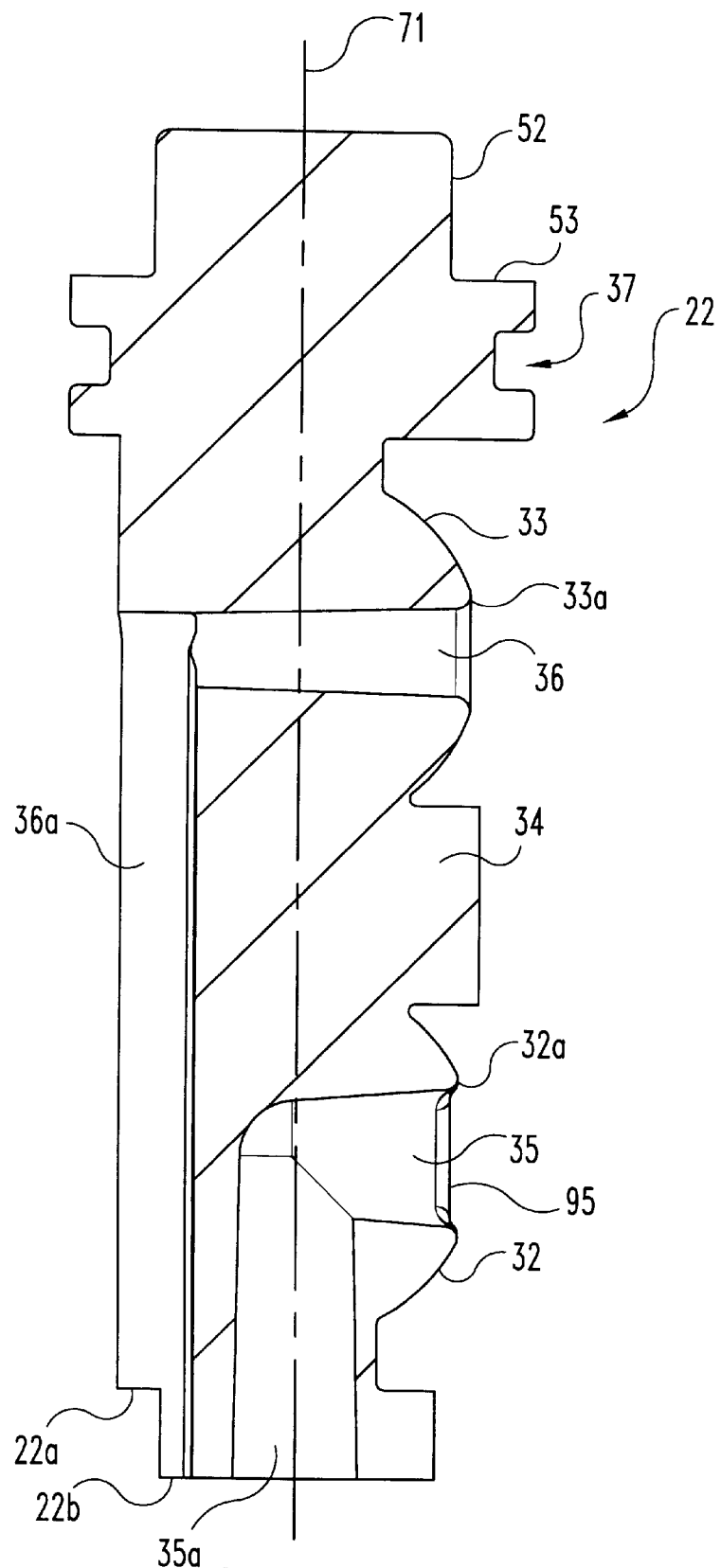
FIG. 11 is a front elevational view in full section of the FIG. 8 flow-control piston.
Figure 12:
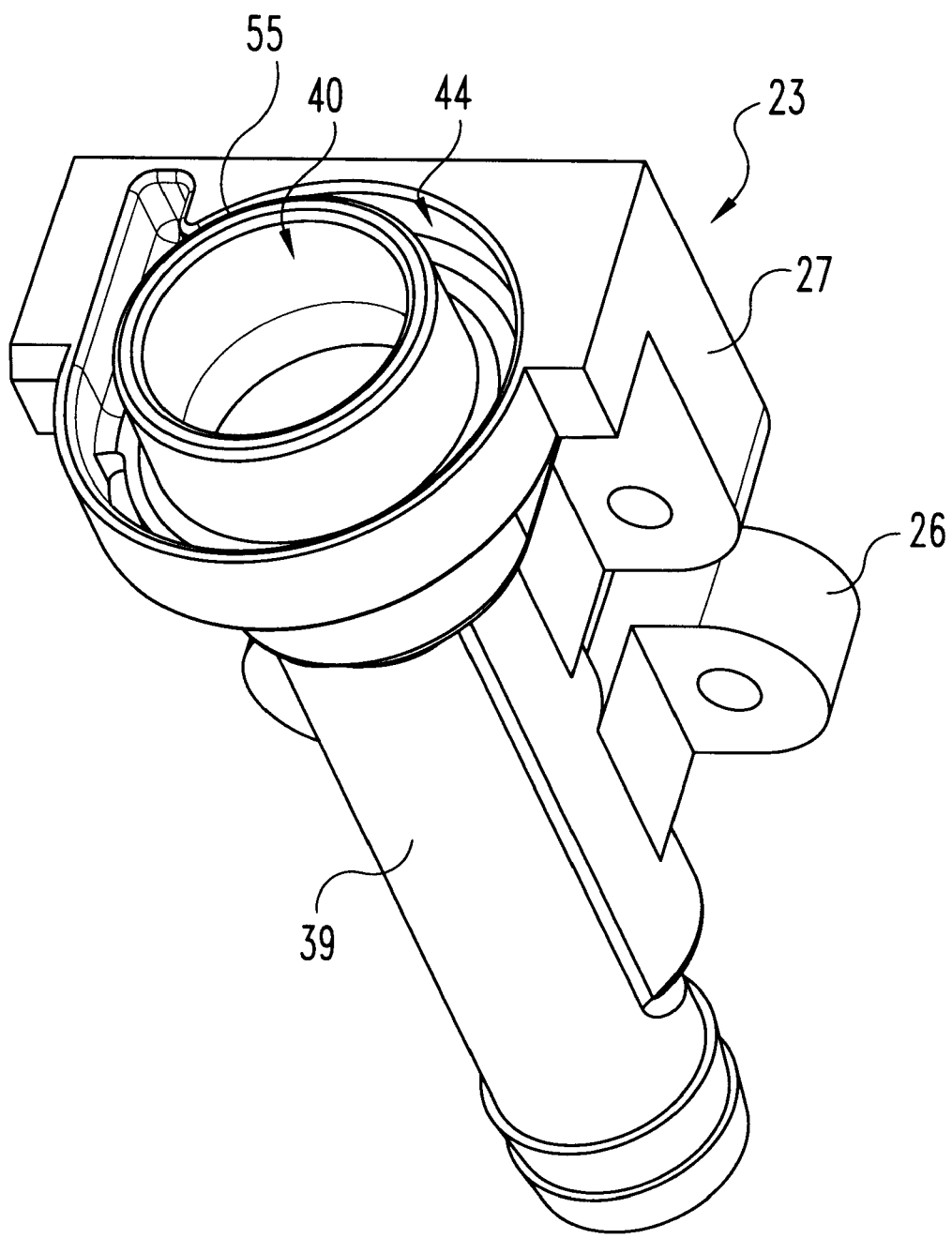
FIG. 12 is a perspective view of a valve housing comprising a portion of the FIG. 1 water drain valve according to the present invention.
Figure 13:
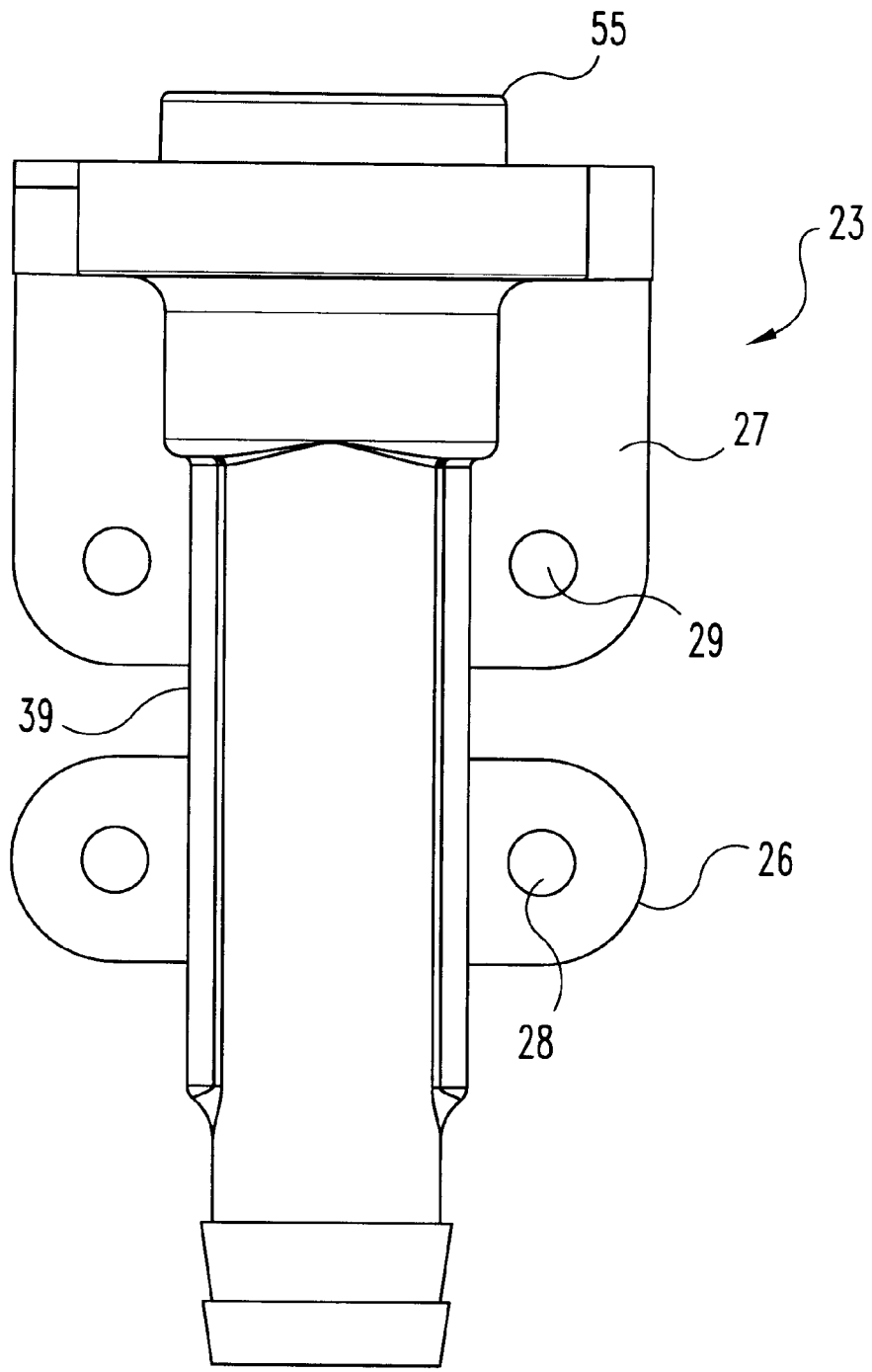
FIG. 13 is a front elevational view of the FIG. 12 valve housing.
Figure 14:
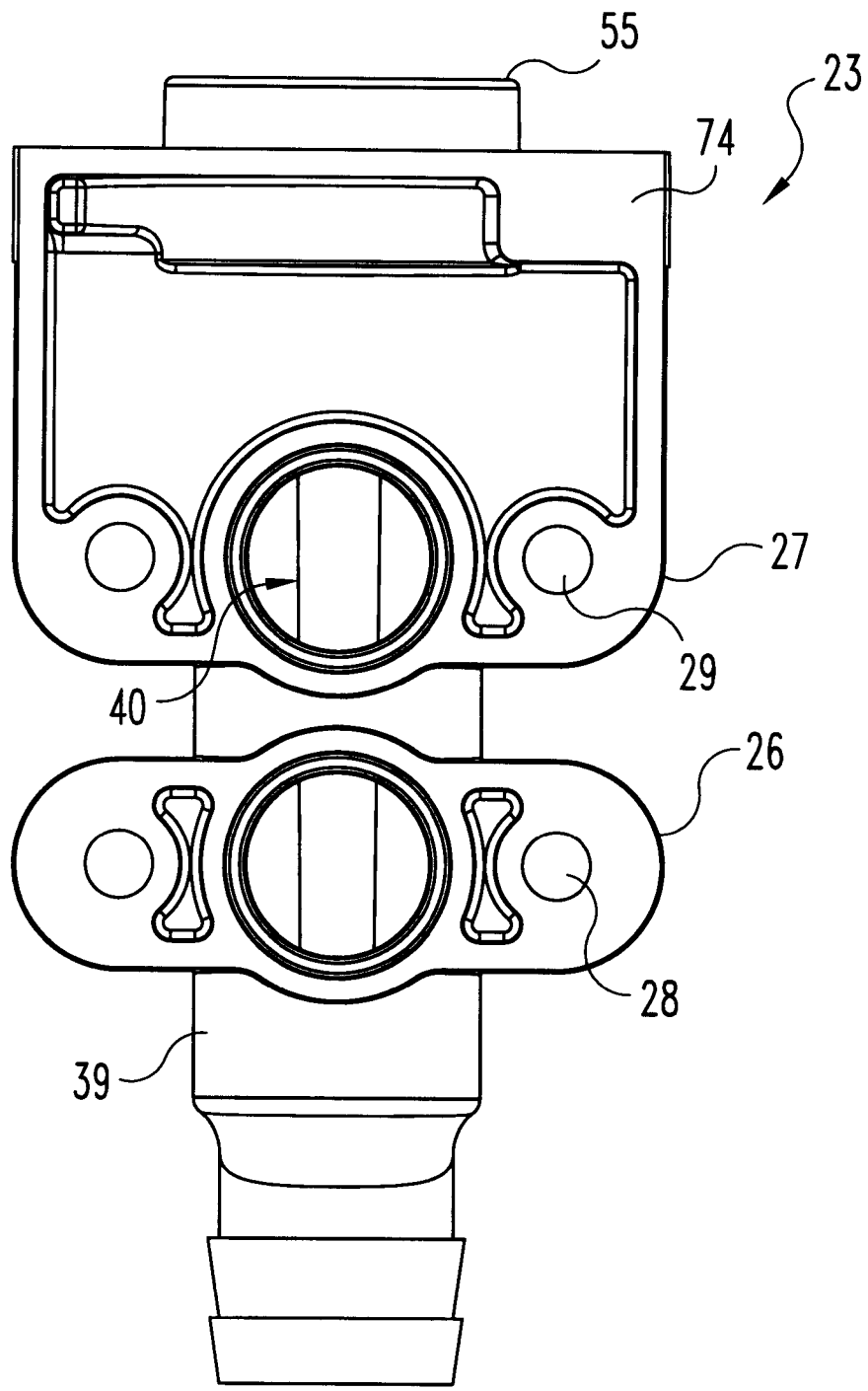
FIG. 14 is a rear elevational view of the FIG. 12 valve housing.
Figure 15:
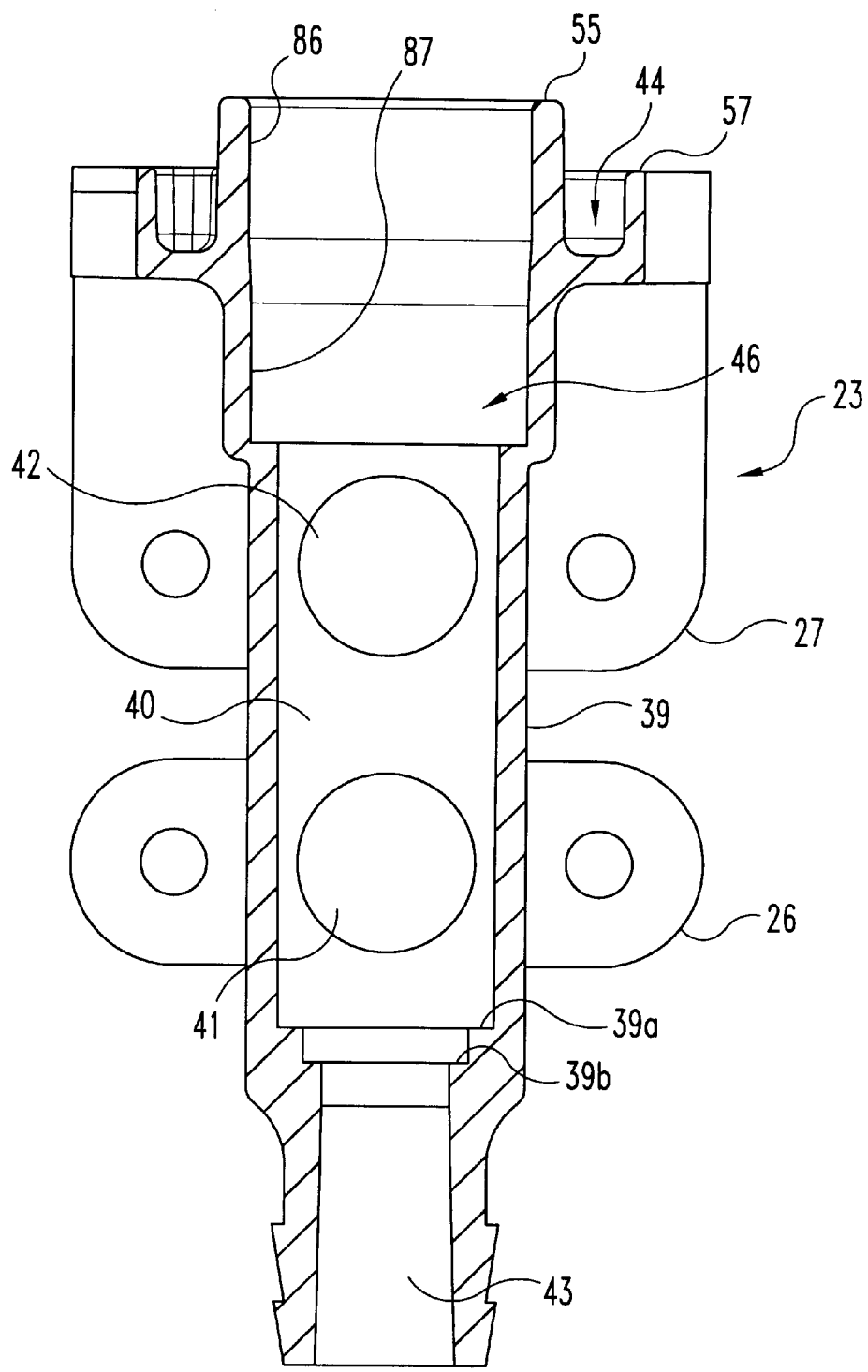
FIG. 15 is a front elevational view in full section of the FIG. 12 valve housing.
Figure 16:
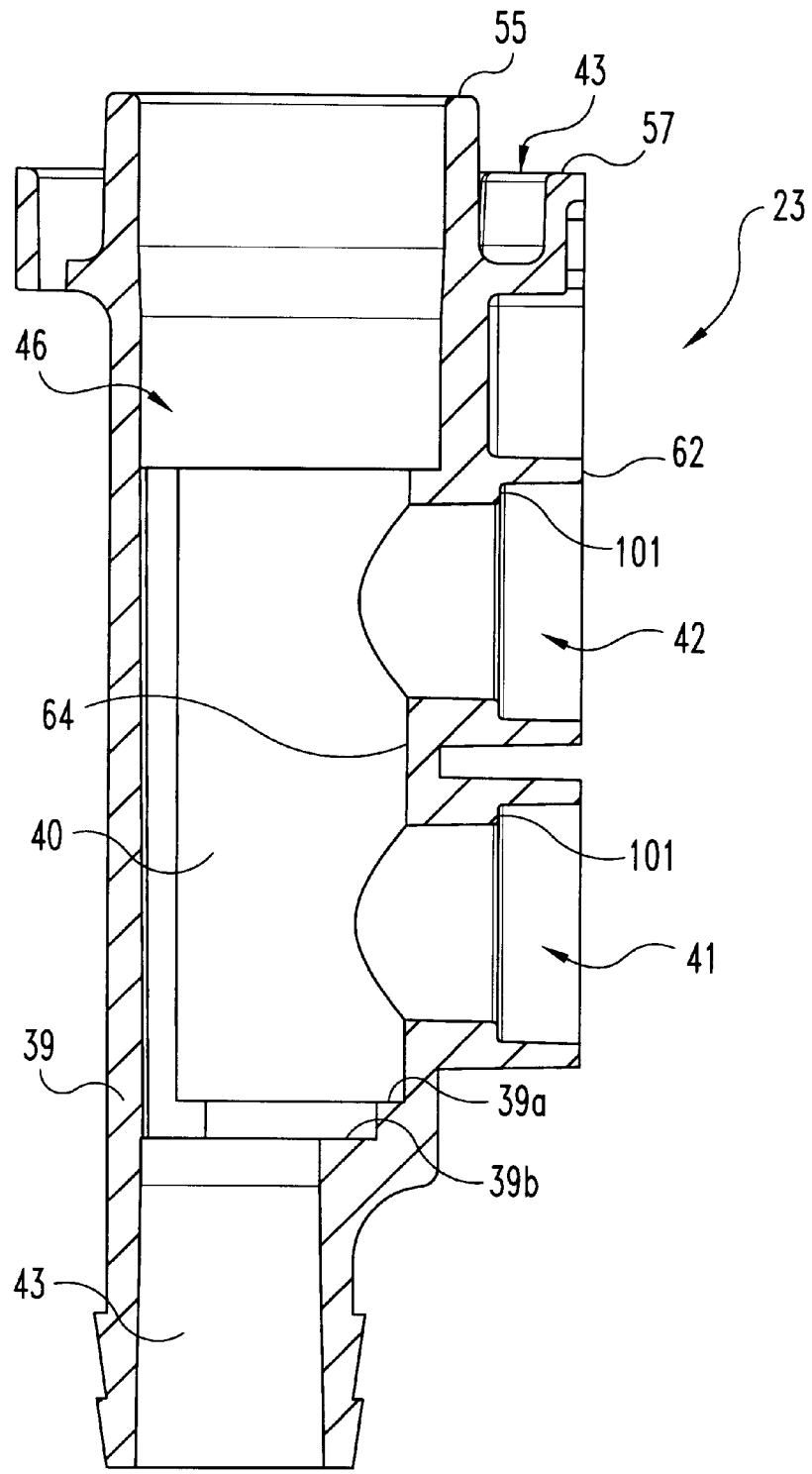
FIG. 16 is a side elevational view in full section of the FIG. 12 valve housing.
Figure 17:
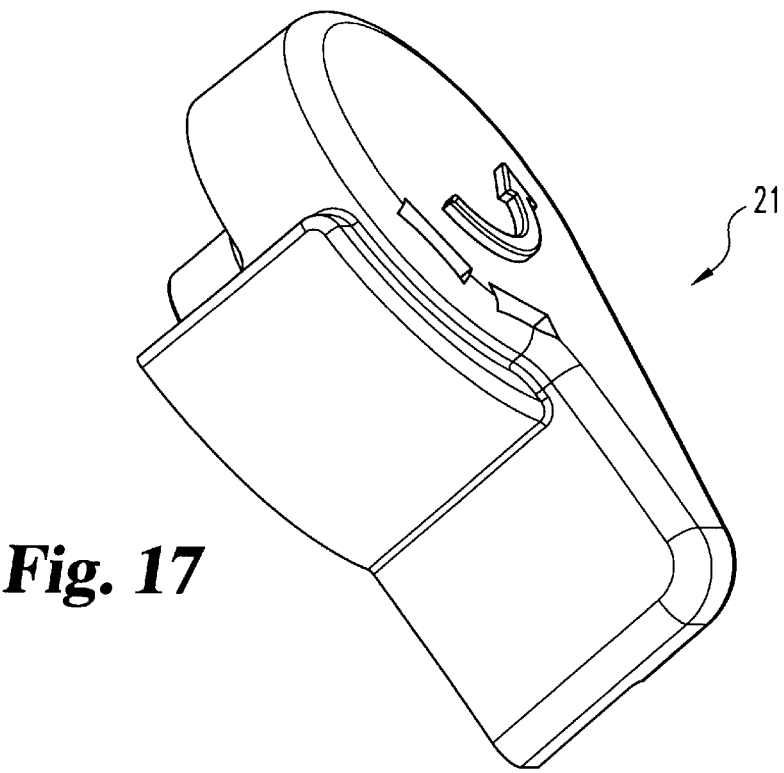
FIG. 17 is a perspective view of a control lever comprising a portion of the FIG. 1 water drain valve.
Figure 18:
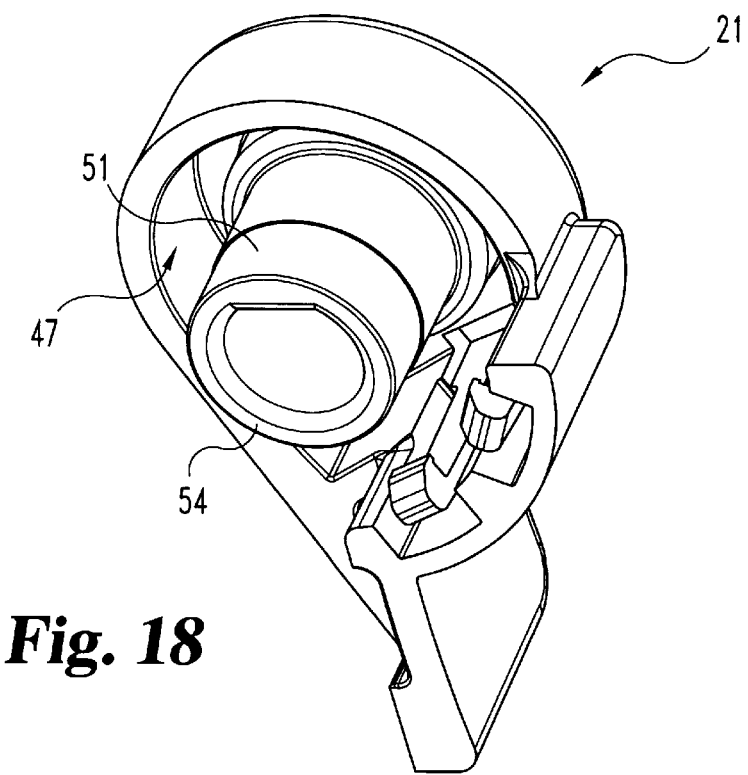
FIG. 18 is a bottom perspective view of the FIG. 17 control valve.
Figure 19:
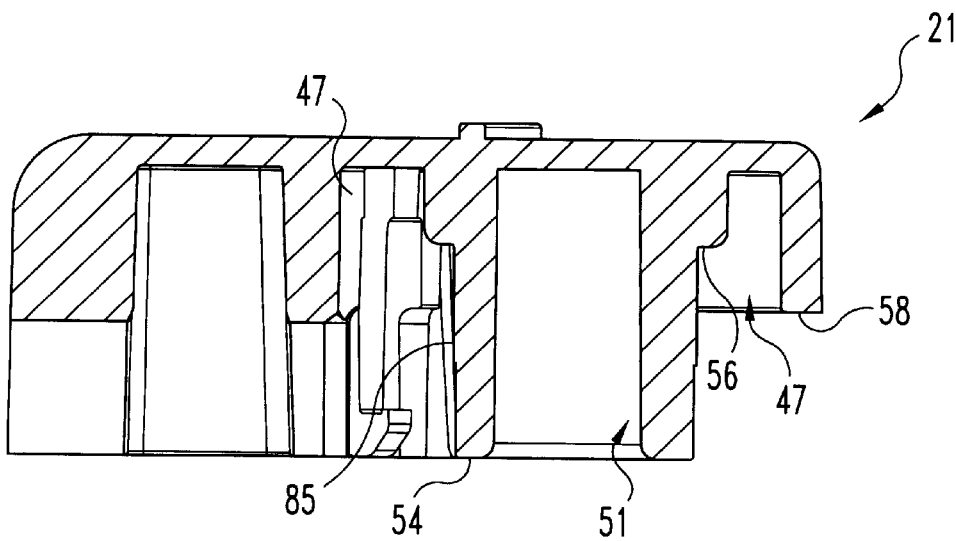
FIG. 19 is a side elevational view in full section of the FIG. 17 control valve.
Figure 20:
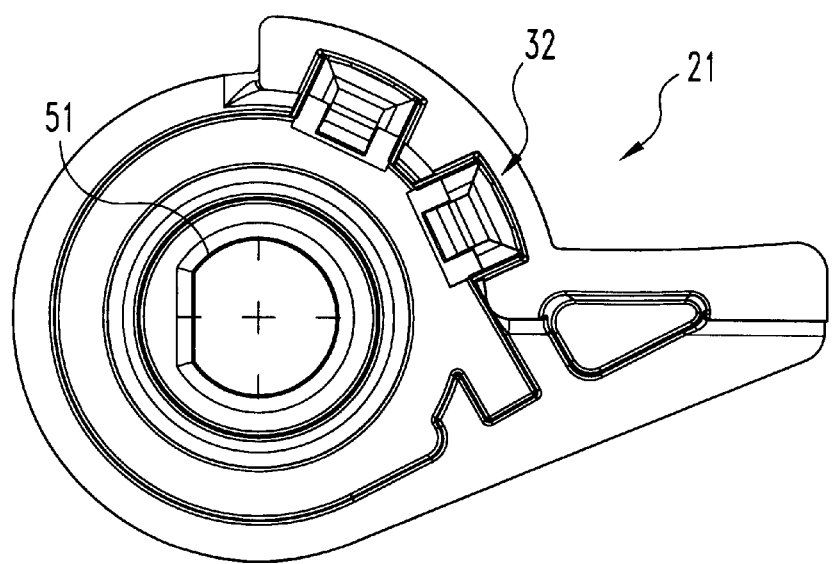
FIG. 20 is a bottom plan view of the FIG. 17 control valve.

The FIG. 11 full section view corresponds to the orientation of piston 22 in FIGS. 5 and 7. In FIGS. 5 and 6, the piston 22 is turned (rotated) so as to close off both the water drain and air vent passageways that extend through the wall of the outer housing 23. In FIG. 7, the piston flow passageways 35 and 36 line up with the water drain and air vent passageways of the outer housing 23. Annular channel 37 is sized and arranged to receive an O-ring 38 for sealing between piston 22 and outer housing 23 (see FIG. 7).

With reference to FIGS. 12, 13, 14, 15, and 16, the details of outer housing 23 are illustrated. As described, outer housing 23 is a unitary structure which includes mounting brackets 26 and 27 and a wall portion 39 defining a hollow interior 40. The FIG. 16 view corresponds to the orientation of outer housing 23 as illustrated in assembly FIGS. 6 and 7 for drain valve 20. The drain passageway 41 which is defined by wall portion 39 has a generally cylindrical, stepped form. The air vent passageway 42, which is also defined by wall portion 39, has a generally cylindrical, stepped form. Both passageways 41 and 42 extend into and are in flow communication with hollow interior 40. The portion of hollow interior 40 adjacent passageways 41 and 42 extends into outlet passageway (i.e., drain port) 43 which is used to drain the water that enters the drain valve by way of passageway 41. Outlet passageway 43 also provides a path for venting air to enter the drain valve 20 and ultimately enter the fuel filter housing by way of passageway 42.

Annular channel 44 in housing 23 receives part (i.e., the lower end) of helical torsion spring 45 (see FIGS. 5, 6, and 7) and the open upper end 46 receives a portion of control lever 21. The control lever also includes an annular channel 47 which axially aligns with channel 44 to receive the remainder (i.e., the upper end) of helical torsion spring 45.

With reference to FIGS. 17, 18, 19, and 20, the details of control lever 21 are illustrated. FIGS. 1–7 also include views of the control lever 21. D-shaped sleeve 51 fits over the upper, generally D-shaped portion 52 of piston 22. The D-shaped design for sleeve 51 and for cooperating portion 52 establishes a fixed rotational relationship and a driver-driven relationship between the sleeve 51 and portion 52. Rotation of the lever 21 causes and controls rotation of piston 22. While spring 45 helps to maintain the desired axial position and relationship between the lever 21 and the piston 22 and housing 23, there is an interfit between lever 21 and housing 23 which helps to maintain the flow-control piston 22 in somewhat of a floating and self-centering arrangement. As is illustrated, there is a separation between the upper surface of shelf 53 of the flow-control piston 22 and the lower end 54 of sleeve 51. There is also clearance between the upper annular edge 55 of housing 23 and the surface 56 of lever 21. Similar clearance exists between outer edge 57 of housing 23 and the outer edge 58 of lever 21. Further, there is axial clearance between the lower end of piston 22 and the lower surface of wall portion 39 leading into outlet passageway 43. Surface 22a is spaced from surface 39a and surface 22b is spaced from surface 39b.

Figure 21:
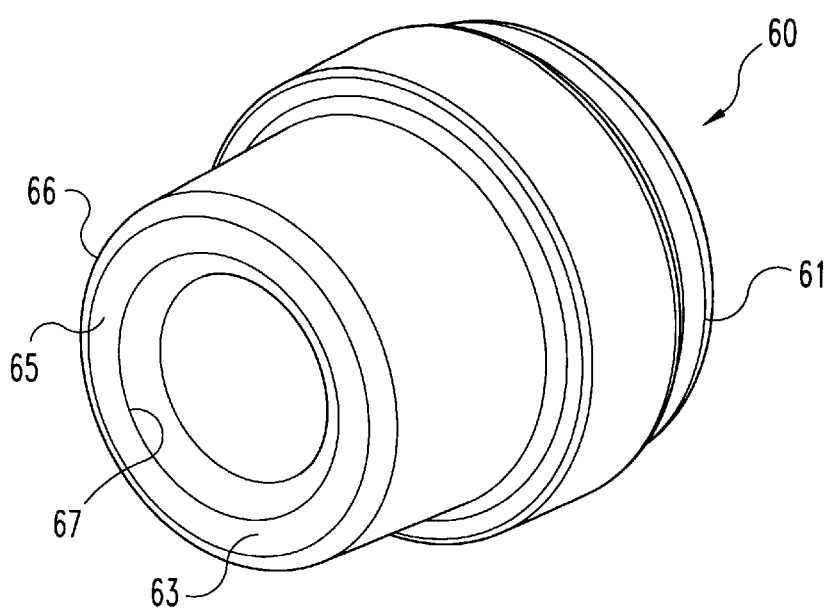
FIG. 21 is a perspective view of a sealing grommet comprising a portion of the FIG. 1 water drain valve.
Figure 22:
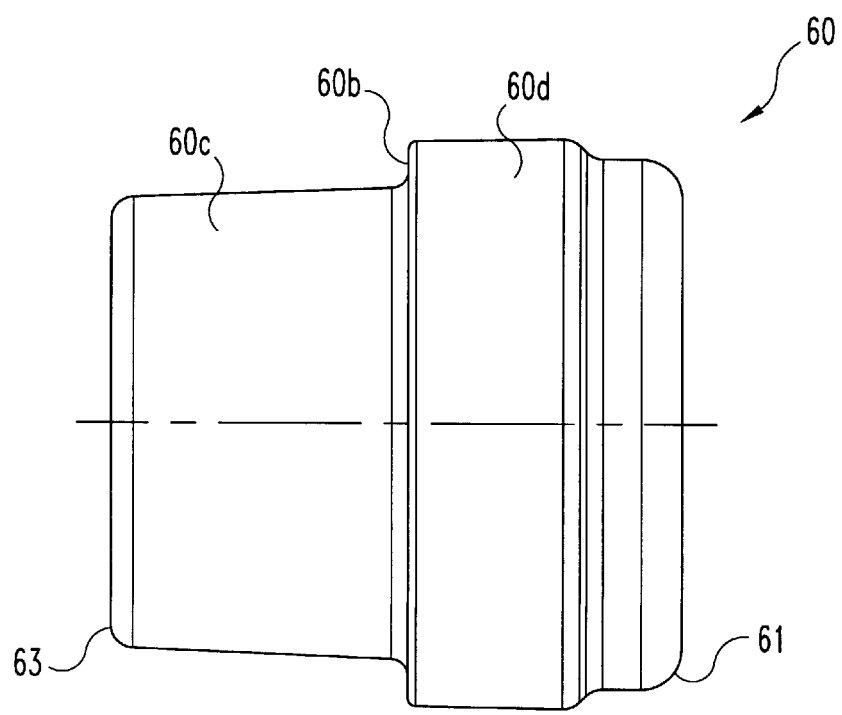
FIG. 22 is a side elevational view of the FIG. 21 sealing grommet.
Figure 23:
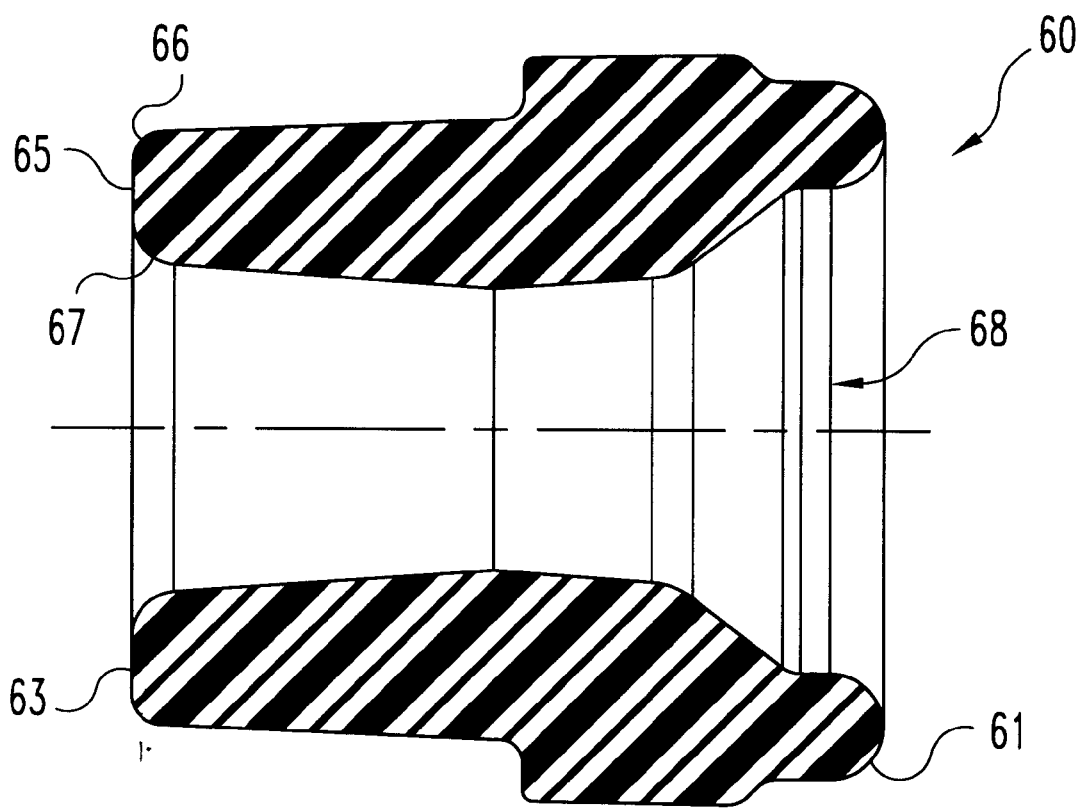
FIG. 23 is a side elevational view in full section of the FIG. 21 sealing grommet.

Referring to FIGS. 21, 22, and 23, a sealing grommet 60 having the form of an annular sleeve is illustrated. A total of two virtually identical sealing grommets 60 and 60a are used in the FIG. 1 water drain valve 20. Each sealing grommet 60 and 60a is fabricated from a compressible, resilient rubber compound so as to facilitate the creation of a sealed interface against the fuel filter housing. Reference herein to grommet 60 or aspects of grommet 60 will include grommet 60a, unless these two need to be differentiated due to their different locations in the valve assembly. The material for the two sealing grommets also facilitates the creation of a sealed interface around the water flow passageway 35 in part-spherical section 32 and around the air flow passageway 36 in part-spherical section 33.

One sealing grommet 60 is inserted into drain passageway 41 and the other sealing grommet 60a is inserted into air vent passageway 42. As illustrated in FIGS. 6 and 7, the radiused outer edge 61 of each sealing grommet extends beyond the outer surface 62 of wall portion 39. When the drain valve 20 is securely mounted to the outer housing of a cooperating fuel filter, the annular outer edge 61 of each grommet 60 and 60a is compressed so as to create a sealed interface around each passageway 41 and 42, respectively, between the drain valve housing and the fuel filter housing. The end 63 of each grommet 60 and 60a which is opposite to outer edge 61, extends into the hollow interior 40 of the outer housing 23 beyond the inner surface 64 which helps to define the hollow interior 40. The outermost surface 65 of end 63 is substantially flat with a rounded outer annular corner 66 and a rounded inner annular corner 67.

The two part-spherical sections 32 and 33 of piston 22 are constructed and arranged to mate with and rotate within the end 63 of each grommet 60 and 60a, respectively. Dimensioning this sealing arrangement or interface can be a problem due to the stack up of the tolerances on the various dimensions of the piston 22, sealing grommets 60 and 60a, and housing 23. The piston 22 must be located so that the part-spherical sections 32 and 33 will align with each corresponding sealing grommet 60 and 60a. The compression of the sealing grommets 60 and 60a must be controlled so as to be sufficient for sealing, but not so great as to cause undue rotational friction when the lever 21 and piston 22 are turned and the drain valve is opened (or closed). Excessive compression can also lead to cutting of the sealing grommets 60 and 60a by the rotating passageways 35 and 36, respectively, in the piston 22 that sweep past the seal faces corresponding to end 63 of each sealing grommet 60 and 60a when the water drain valve 20 is operated, especially if these passageways 35 and 36 intersect the outside of the part-spherical sections 32 and 33 with a sharp edge. The disclosed drain valve design, according to the present invention, addresses these issues.

Internal sealing of the separate air vent path through grommet 60a which is assembled into passageway 42 and the water drain path through grommet 60 which is assembled into passageway 41 is provided by the interference between the two sealing grommets 60 and 60a that intersect the two corresponding part-spherical sections 32 and 33 on the piston 22, perpendicular to the axis 71 of the piston (see FIG. 11). Operation of the normally-closed drain valve 20 is achieved when lever 21 is rotated 90 degrees. This rotation moves the water flow passageway 35 into alignment with the flow path 68 through grommet 60 and the air flow passageway 36 into alignment with the flow path 69 through the other grommet 60a. In this condition, passageway 35 is flow coupled to outlet passageway 43 by way of connecting passageway 35a. Similarly, passageway 36 is flow coupled to outlet passageway 43 by way of connecting passageway 36a. The helical torsion spring 45 returns the lever 21 to the normally-closed position.

The proposed valve 20 removes the inherent axial tolerance stack-up in the assembly of piston 22, housing 23, and sealing grommets 60 and 60a by the addition of a unique alignment portion 34 that is dimensioned directly from the centerline of each part-spherical section 32 and 33. This portion 34 contacts each sealing grommet 60 and 60a in a radial manner, only if an axial force is applied to the piston 22. This dimensional relationship uses only the centerline location (i.e., spacing) of the sealing grommet 60 and 60a in the housing 23, the diameter of each sealing grommet 60 and 60a, the location of the part-spherical sections 32 and 33, and the radial distance to the top and bottom surfaces 34a and 34b, respectively, of portion 34. Small clearance spaces 77 and 78 are provided to allow a primary location of the part-spherical sections 32 and 33 by interfacing with the cylindrical ends 63 of the sealing grommets 60 and 60a. This arrangement provides a much tighter control than by possibly using the bottom surface 22b of the piston 22 against the bottom surface 39a of the housing 23 in combination with an upper surface 53 of the piston 22 against the bottom of an inserted ring to limit the axial travel.

Figure 24:
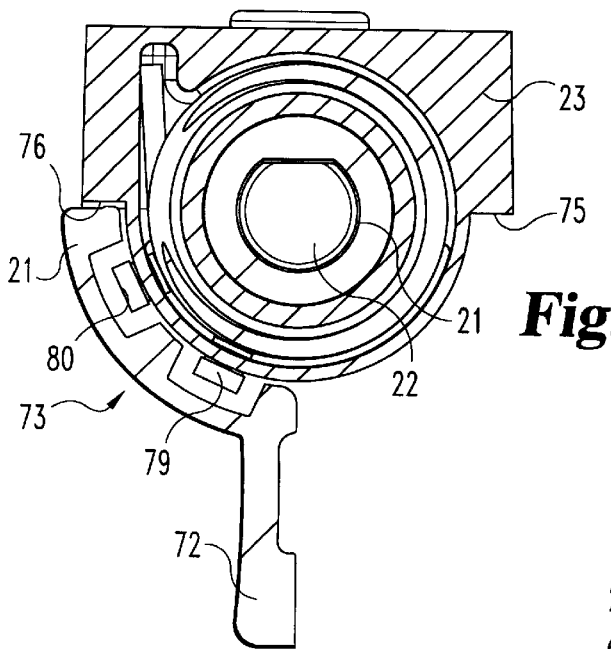
FIG. 24 is a top plan view in full section of the FIG. 6 assembly (closed condition) as viewed along line 24—24 in FIG. 6.
Figure 25:
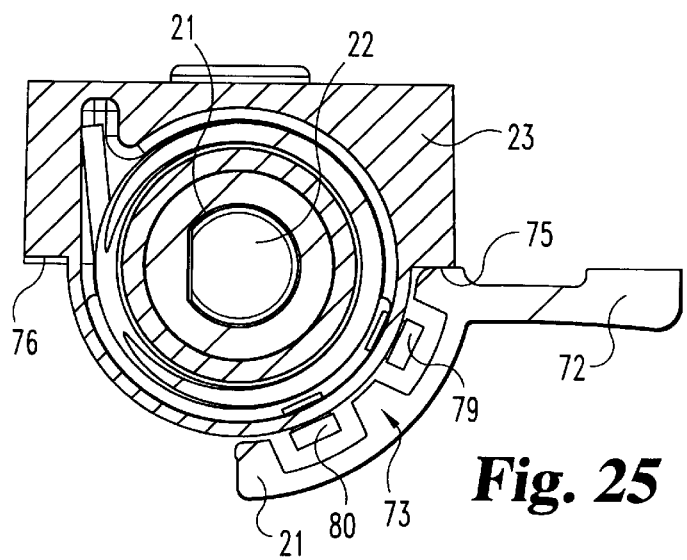
FIG. 25 is a top plan view in full section of the FIG. 7 assembly (open condition) as viewed along line 25—25 in FIG. 7.
Figure 26:
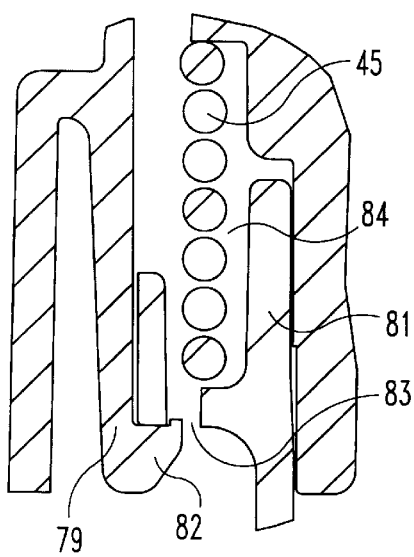
FIG. 26 is an enlarged, side elevational detail view in full section of a snap arrangement according to the present invention as viewed along line 26—26 in FIG. 2.

Piston 22 is permitted to float freely in an axial direction, thereby allowing the primary self-alignment or self-centering to be between the part-spherical sections 32 and 33 and the sealing grommets 60 and 60a. To facilitate this construction and to eliminate the possibility of someone pulling the valve 20 apart with an axial force on the handle 72 of lever 21, the lever 21 is separated from the piston 22. A unique, tapered, cantilever snap arrangement 73 between the lever 21 and housing 23 retains the lever 21 to the valve 20 without fastening it to the piston 22, see FIGS. 24, 25, and 26. Rotational engagement between the valve 20 and the lever 21 is made by the loose fitting combination of D-shaped sleeve 51 and D-shaped portion 52. In view of the substantially flat rear mounting surface 74 on housing 23, no part of the lever 21 is permitted to sweep beyond the edge of the mounting surface 74 during rotation. This limitation combined with a desire to keep the valve 20 as small as possible, the use of a helical torsion spring 45 of adequate diameter, and the provision for external rotational stop 75 and 76 prevents the option of using opposing snaps (not shown) in order to retain the lever 21 to the housing 23. As a result and as illustrated in FIGS. 24, 25, and 26, the proposed valve 20 uses two tapered cantilever snaps 79 and 80 placed on the lever 21 near the handle 72. These snaps 79 and 80 hook under the outside of the spring housing 81. To prevent the snaps 79 and 80 from being unhooked due to a rotation, perpendicular to the axis of the piston 22, caused by someone pulling up on the handle 72, each snap 79 and 80 is formed with a small hook 82 on the end that hooks into a radial slot 83 in the underside of the spring housing 81.

This slot 83 also provides a drain for liquids or other debris that may find their way into the spring cavity 84 or into the annular channel 44. To provide additional support, a stepped boss 85 on the lever 21 mates with two stepped bearing surfaces 86 and 87 in the top of the housing 23. Finally, to give the lever 21 a good feeling and keep it from rattling, an axial pitch is introduced into the helical torsion spring 45. This provides a slight axial force to take the play out of the drain valve 20, by pulling the snaps 79 and 80 tightly into the slot 83 and the bottom of the spring housing 81.

Figure 9:
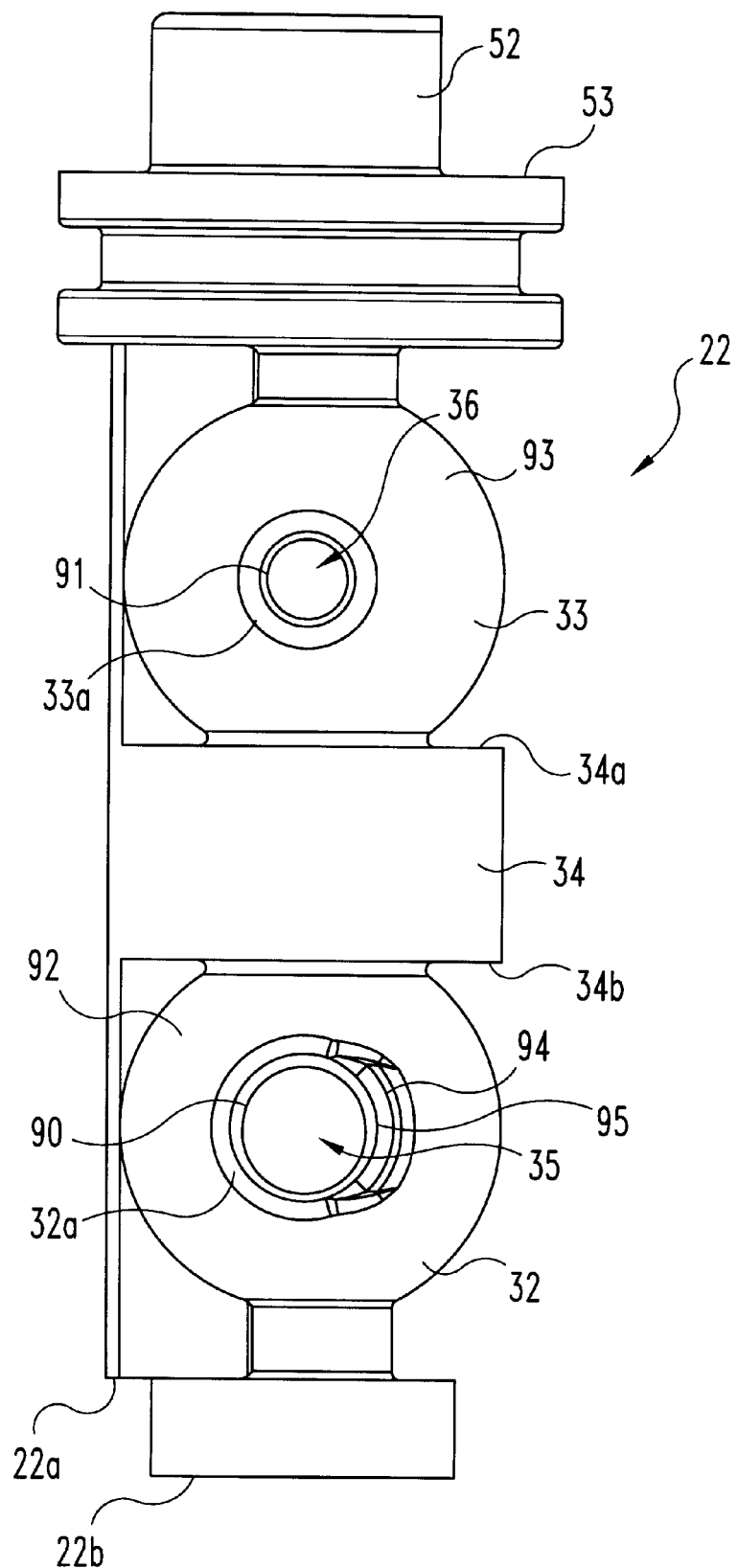
FIG. 9 is a right side elevational view of the FIG. 8 flow-control piston.
Figure 10:
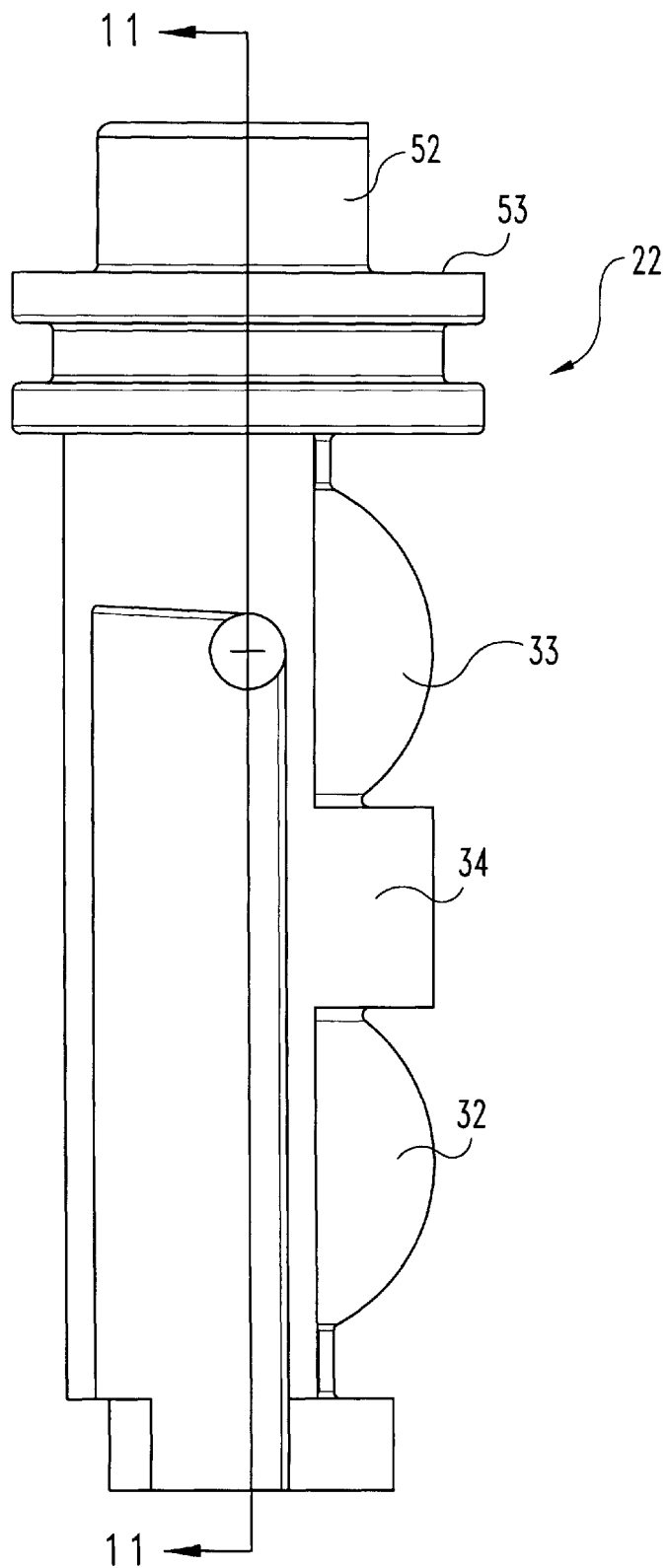
FIG. 10 is a left side elevational view of the FIG. 8 flow-control piston.

The outer edges 90 and 91 of the passageways 35 and 36, respectively, that intersect with the surfaces 92 and 93 of the part-spherical sections 32 and 33, respectively, to provide flow for water and air are rounded to prevent cutting of the sealing grommets 60 and 60a (see FIG. 9). However, the larger diameter of the liquid passageway 35 allows grommet 60 to protrude into the passageway 35 as the passageway 35 passes the grommet 60 during valve 20 operation. This situation can cause the valve 20 to stick in the open position (see FIG. 7) and possibly damage the grommet 60. To eliminate this problem, the leading edge 94 of the passageway 35 in the closing direction of the valve is relieved with a generous relief 95, giving the opening of the passageway 35 a teardrop shape. Maintaining the original diameter while relieving the leading edge 94 minimizes any tendency of grommet 60 to sink into the piston 22, by providing the maximum allowable support.

The design for the sealing grommets 60 and 60a is unique in several ways. First, the grommets align with their mating part-spherical sections 32 and 33 with a type of ball and socket effect. Second, they provide an axial retention and self-centering feature to the assembly due to their relationship with portion 34 on the piston. Third, they are stepped at annular shoulder 60b to prevent improper assembly and provide a means of adjustment for compression against the piston 22. Shoulder 60b establishes the dividing line between smaller diameter section 60c and the larger diameter section 60d. Finally, they provide alignment for the assembly of the valve 20 to the filter housing. The grommets 60 and 60a serve to isolate all fuel from the inside of the valve 20 when the valve 20 is closed. This is achieved by compressing each sealing grommet relative to its own axis. This compression is possible by providing a stepped cylindrical cavity, i.e., passageways 41 and 42, for each grommet 60 and 60a, respectively, in the housing 23 that is shorter in length than the length of each grommet. It is desired that the outer edge 61 of each grommet that mates with the filter housing (not shown) act as a seal for the valve outer housing 23 to the filter housing interface. This requires a certain amount of compression to overcome the internal pressure of the fuel system. The sealing grommets also must provide adequate sealing against the piston 22 without causing undue friction that might cause the valve 20 to stick in the open position. The overall amount of compression can be adjusted by adjusting the overall length of the grommets 60 and 60a relative to the depth or length of passageways 41 and 42 in the housing 23. Furthermore, the stepped design of each passageway 41 and 42, noting stepped edge 101 in each, enables the design of the present invention to maintain a higher compressive force between the valve housing and the filter housing by isolating a portion of the resulting axial force of the interference at the valve housing to the filter housing interface. Stepped edge 101 coincides with shoulder 60b of each grommet. By moving the depth of this step 101 deeper or shallower in the passageways 41 and 42 and by adjusting the amount of compression in that area, the sealing force of the opposing ends of the grommets 60 and 60a can be adjusted for their particular function in the assembly.

One benefit of the present invention is the provision of a floating piston design that is free from the lever and that is therefore free to be located and retained by the sealing grommets 60 and 60a Another benefit of the present invention is the snap-fit lever with snaps on the one side, retained by the locking action of the hook shaped snaps into a slot that also serves to drain the spring cavity, limited in rotation perpendicular to the axis of the piston by radial plain bearings (not shown) and made virtually rattle free by an axially pitched helical torsion spring. The teardrop shaped relief on the edge of the drain passage is considered an advantage. Finally, the unique, stepped cylindrical grommets that form a ball and socket with the spherical sections of the piston, while preventing improper installation and providing a way to adjust the sealing force are considered an advantage of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A water drain valve for use in cooperation with a fuel filter having a water separation capability, said water drain valve comprising:

a valve housing having a sidewall defining a first flow aperture therethrough and a second flow aperture therethrough and further defining a hollow interior extending into a drain opening;

a flow-control piston positioned within said hollow interior and including a first portion defining a water drain passageway leading to said drain opening and a second portion defining an air flow passageway leading from said drain opening;

a first sealing grommet assembled into said first flow aperture, said first sealing grommet having a sidewall defining a water flow path into said water drain valve and being constructed and arranged to sealingly engage said first portion;

a second sealing grommet assembled into said second flow aperture, said second sealing grommet having a sidewall defining an air flow path out of said water drain valve and being constructed and arranged to sealingly engage said second portion; and a control lever assembled to said valve housing and being constructed and arranged to rotate said flow-control piston from a water drain valve normally-closed condition wherein flow communication between said water flow path and said water drain passageway is closed and flow communication between said air flow passageway and said air flow path is closed to a water drain valve open condition wherein said water drain passageway is aligned with and in flow communication with said water flow path and said air flow path is aligned with and in flow communication with said air flow passageway.

2. The water drain valve of claim 1 wherein said valve housing is a unitary structure.

3. The water drain valve of claim 2 wherein said flow-control piston is a unitary structure.

4. The water drain valve of claim 3 wherein said first portion is constructed and arranged with a part-spherical section.

5. The water drain valve of claim 4 wherein said first portion defines a water drain passageway.

6. The water drain valve of claim 5 wherein said second portion is constructed and arranged with a part-spherical section.

7. The water drain valve of claim 6 wherein said second portion defines an air vent passageway.

8. The water drain valve of claim 7 wherein said first sealing grommet and said second sealing grommet are each constructed and arranged with a first section and a second section which is separated from said first section by an annular shoulder.

9. The water drain valve of claim 8 wherein said first section of said first sealing grommet is in sealing contact with the part-spherical section of said first portion.

10. The water drain valve of claim 9 wherein said first section of said second sealing grommet is in sealing contact with the part-spherical section of said second portion.

11. The water drain valve of claim 1 wherein said flow-control piston is a unitary structure.

12. The water drain valve of claim 1 wherein said first portion is constructed and arranged with a part-spherical section.

13. The water drain valve of claim 12 wherein said first portion defines a water drain passageway.

14. The water drain valve of claim 1 wherein said second portion is constructed and arranged with a part-spherical section.

15. The water drain valve of claim 14 wherein said second portion defines an air vent passageway.

16. The water drain valve of claim 1 wherein said first sealing grommet and said second sealing grommet are each constructed and arranged with a first section and a second section which is separated from said first section by an annular shoulder.

17. The water drain valve of claim 16 wherein said first section of said first sealing grommet is in sealing contact with the part-spherical section of said first portion.

18. The water drain valve of claim 17 wherein said first section of said second sealing grommet is in sealing contact with the part-spherical section of said second portion.

19. The water drain valve of claim 1 wherein said flow-control piston includes a D-shaped portion and said control lever includes a cooperating D-shaped sleeve which is constructed and arranged to fit onto said D-shaped portion.

20. The water drain valve of claim 19 which further includes a spring which is constructed and arranged with a first end of said spring fitting within a channel in said control lever and with a second end of said spring fitting within a channel in said valve housing.

21. The water drain valve of claim 20 wherein said control lever is coupled to said valve housing by a snap arrangement which permits rotation of said control lever without pulling off axially from said valve housing.

22. The water drain valve of claim 21 wherein said snap arrangement includes a hook as part of said control lever and a slot defined by said valve housing.

23. The water drain valve of claim 22 wherein said slot opens into the channel in said valve housing.

24. The water drain valve of claim 23 wherein said spring is a helical torsion spring.

25. The water drain valve of claim 1 which further includes a spring which is constructed and arranged with a first end of said spring fitting within a channel in said control lever and with a second end of said spring fitting within a channel in said valve housing.

26. The water drain valve of claim 25 wherein said spring is a helical torsion spring.

27. The water drain valve of claim 1 wherein said control lever is coupled to said valve housing by a snap arrangement which permits rotation of said control lever without pulling off axially from said valve housing.

28. The water drain valve of claim 27 wherein said snap arrangement includes a hook as part of said control lever and a slot defined by said valve housing.

29. The water drain valve of claim 28 wherein said slot opens into the channel in said valve housing.

* * * * *